(12) United States Patent
Schuller et al.

(10) Patent No.: US 7,292,921 B2
(45) Date of Patent: Nov. 6, 2007

(54) METHOD FOR ACTIVATING RESTRAINING MEANS

(75) Inventors: Hermann Schuller, Sindelfingen (DE); Gunther Lang, Stuttgart (DE); Josef Kolatschek, Weil der Stadt (DE); Sabine Aust, Stuttgart (DE); Thomas Lich, Schwaikheim (DE); Armin Koehler, Sachsenheim (DE); Klaus Mindner, Ludwigsburg (DE); Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 10/534,663

(22) PCT Filed: Jun. 2, 2003

(86) PCT No.: PCT/DE03/01798

§ 371 (c)(1),
(2), (4) Date: Nov. 28, 2005

(87) PCT Pub. No.: WO2004/043745

PCT Pub. Date: May 27, 2004

(65) Prior Publication Data

US 2006/0095183 A1 May 4, 2006

(30) Foreign Application Priority Data

Nov. 11, 2002 (DE) .................... 102 52 227

(51) Int. Cl.
*B60R 22/00* (2006.01)

(52) U.S. Cl. .............. 701/45; 701/301; 180/271; 280/734; 280/735; 340/903

(58) Field of Classification Search ............. 701/45, 701/46, 301; 180/271, 282; 280/734, 735; 340/901, 903
See application file for complete search history.

(56) References Cited

U.S. PATENT DOCUMENTS 5,327,014 A * 7/1994 Huber et al. ............. 307/10.1
5,742,916 A * 4/1998 Bischoff et al. ............. 701/45

FOREIGN PATENT DOCUMENTS

| DE | 197 40 020 | 3/1999 |
|---|---|---|
| DE | 198 16 989 | 11/1999 |
| DE | 199 09 538 | 9/2000 |
| DE | 100 59 426 | 6/2002 |
| DE | 101 09 043 | 7/2002 |
| DE | 101 16 926 | 10/2002 |
| EP | 1 000 820 | 5/2000 |
| WO | 97 21566 | 6/1997 |

* cited by examiner

*Primary Examiner*—Gertrude A. Jeanglaude
(74) *Attorney, Agent, or Firm*—Kenyon & Kenyon LLP

(57) ABSTRACT

A method for triggering restraint devices in which at least one collision-indicating signal is generated. From the moment that a collision is detected, temporally defined crash phases are specified, and, for every crash phase, a crash type and a crash severity are determined from the signal. The appropriate restraint devices are triggered as a function of the crash severity and/or the crash type.

18 Claims, 7 Drawing Sheets

METHOD FOR ACTIVATING RESTRAINING MEANS

PRIORITY APPLICATION INFORMATION

This application claims priority to and the benefit of German Patent application no. 102 52 227.8, which was filed in Germany on Nov. 11, 2002, the disclosure of which is hereby incorporated by reference.

FIELD OF THE INVENTION

The present invention is based on a method for triggering restraint devices.

BACKGROUND INFORMATION

German Patent document no. 199 09 538 A1 refers to a method for triggering restraint devices, in which initially the crash type is determined. If a crash type cannot be inferred unequivocally, probability values are used. The method has a modular structure and features an accident classification module, a calculation module and a comparison module.

SUMMARY OF THE INVENTION

By contrast, the exemplary method according to the present invention for triggering restraint devices having the features of the independent claim has the advantage that the crash type and also the crash severity are determined for crash phases, which begin with the detection of a collision. This allows for an early decision regarding triggering. Thus accidents constituting a powerful event, i.e. a severe accident, may result already early on in the triggering of restraint devices. Experience shows that the longer a triggering decision or a triggering of restraint devices is deferred, the more difficult and complex will be the triggering algorithm. Hence it is practical to be able to make decisions already early on so as to save time and complexity by virtue of a simpler structure of the algorithm. The simple and structured design of the method or algorithm according to the present invention additionally allows for the simple integration of new functions. Overall, the exemplary method according to the present invention results in better triggering and a more accurately timed triggering of restraint devices.

The use of crash phases and an associated control of the sensitivities of the crash severity detection system allow for the crash severity to be optimally ascertained in agreement with the collision sensor signals. Furthermore, a crash phase and a crash type detection system for controlling the sensitivity of the crash severity algorithms may be provided. The crash type detection system allows for an adapted selection of the crash severity algorithm and hence for specific crash severities for the individual crash severity algorithms. The modular structure of the algorithm as a whole is thus expandable by additional modules. An expansion of the module functionality is provided for by the modular structure itself. If new crash types are added that are to be detected, if need be, a sub-module may be created for each module. The method or algorithm according to the present invention avoids all feedback. Furthermore, a uniform structure for expansions such as the addition of upfront sensors, for example, is provided.

Especially advantageous is the fact that the crash phases are defined as a function of the vehicle type. The crash phases in particular depend on experimental crash tests so as to respond to the deformability of the specific vehicle type.

The crash type for each crash phase is determined particularly by the fact that for different crash types—frontal collision, offset collision, side collision, rear collision, crash into a deformable barrier or a crash into a post—the at least one signal from the collision sensor is analyzed and the results of these analyses are combined with one another to determine the crash type. Thus, the collision signal can be analyzed in parallel for the various possible crash types so as to determine which crash type is the suitable one. If no clear classification results, calculations can be based on probabilities. Thus a weighted combination of various crash types is performed. The crash type thus amalgamated then determines whether one or more algorithms are used to determine the crash severity. If the crash type, for example, cannot be classified unequivocally, multiple algorithms are used to determine the crash severity so as to form a weighted sum of the crash severity in this case as well.

It is furthermore advantageous that the triggering of the restraint devices is in the end carried out only as a function of a plausibility signal. This plausibility signal is also derived from the at least one signal of the collision sensor. This results in an increased reliability of the method according to the present invention.

In addition it is advantageous that, for each of the various collision sensors in the vehicle, the crash severity is ascertained separately for every crash phase in the manner described above. The resulting crash types and crash severities for the individual collision sensors are then combined with one another to ascertain in each case one crash type and one crash severity. Another possibility for determining the suitable crash type or crash severity lies in the meaningful combination of different types of sensor signals, which in a joint evaluation yield a crash type or crash severity. Such diverse collision sensors include the sensors in the central unit, for example on the vehicle tunnel, and upfront sensors, i.e. in particular those mounted on the radiator, and also side collision sensors. Deformation sensors, indirect deformation sensors such as pressure and temperature sensors and pre-crash sensors may also be used as collision sensors, in addition to the usual acceleration sensors. A refinement provides for the derivation of a weighting factor as a function of the particular crash type or crash severity ascertained, the weighting factor being used for the individual crash type for the respective collision sensor. This makes it possible to assign, during a frontal collision for example, a higher weight on the upfront sensor with respect to the crash types or crash severity ascertained here than to the sensor in the central unit. This allows for a more precise determination of the crash type or the crash severity and thus for better triggering of the restraint devices. This evaluation may be continuous, i.e. using weighting factors representing a series of numbers, or also discrete, in which case a threshold is used to decide whether, for example, the values of a collision sensor are used at all or are weighted very heavily.

DETAILED DESCRIPTION

The following describes a method for triggering restraint devices, which is particularly distinguished by the fact that it features no feedback and that it operates with fixed thresholds. It is a distinguishing feature that here various characteristics are extracted from the acceleration values, for example a windowed integral of the acceleration, i.e. a speed value.

Furthermore, a new feature of the method according to the present invention is the use of crash phases. As shown above, this allows for a decision already to be made early on regarding some types of accidents or crash severities so that subsequently only the other types of accidents and crash severities requiring a later decision remain to be processed using a more complex algorithm. As shown above, the crash phases depend on the vehicle type.

If, when employing a windowed integral, variable window lengths are used in the extraction of characteristics, they can be controlled with the aid of time sequences without the use of a timer or a counter. The crash phases are controlled via such implicit times. Within the individual crash phases, the individual thresholds may be applied in various ways using the characteristics to reach a decision, e.g. regarding crash types. Due to the fact that no timer is used, such a timer can also not influence the algorithm negatively due to faulty or false signals, i.e. a misuse.

The results of the preceding blocks can be summarized within the logic gap of the algorithm. Due to the structure, it is possible to process sequences in parallel within the preceding blocks. In the crash-type detection, the crash types thus may all be computed in parallel and are then amalgamated via a logic. Due to this parallelization, it is also readily possible to expand the algorithm or the method by an additional functionality, simply by adding more new blocks. Within the logic, data regarding the quality of the signals or regarding their priorities are processed. This can also be interpreted as importance and thus represents an important feature. However, other types of data could be processed. Only similar information, whether, for example, a specific crash type was ascertained or not, is processed in the logic blocks.

Thus the algorithm is not based on the separation of signals into an acceleration path and an integrator path. The algorithm uses integrated signals exclusively. Using suitable methods, characteristics are then extracted from these signals, which are evaluated via applicable thresholds and which yield information regarding the crash type, i.e. the type of collision, and/or the crash severity, i.e., the severity of the collision. The algorithm is modularly structured in such a way that new types of collision or severities of collision are easily integrated.

Figure 1:
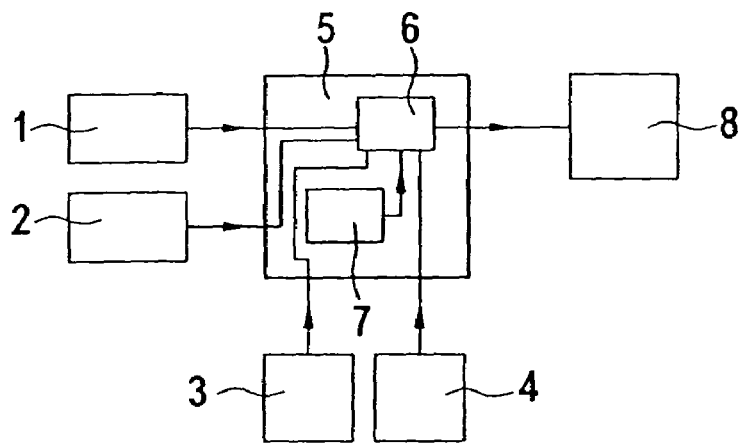
FIG. 1 shows a block diagram of the exemplary device according to the present invention.

FIG. 1 shows the apparatus according to the present invention in a block diagram. Two upfront sensors 1 and 2 mounted on the radiator of a vehicle are connected to a control unit 5 via lines. Upfront sensors 1 and 2 provide acceleration signals as digital signals to control unit 5. These digital signals are processed by a processor 6 in control unit 5. Processor 6 is also connected to an acceleration sensor 7 in control unit 5. Processor 6 also processes the signal of this acceleration sensor, which is for example connected to an analog input of processor 6. Control unit 5 is furthermore connected to a side-impact sensor system 3. Side-impact sensors may be acceleration sensors or deformation sensors or indirect deformation sensors such as pressure or temperature sensors. Surround sensors may be used here as well. Surround sensors 4, however, are also connected to control unit 5 and thereby to processor 6. The type of sensors especially used as pre-crash sensors may also be used to determine a collision signal. Sensor system 7 in control unit 5 is usually an acceleration sensor, the acceleration sensor being configurable to have a sensitivity in the X direction and in the Y direction. Control unit 5 and hence processor 6 are connected to restraint devices 8 via a data output. These restraint devices 8 include seatbelt tensioners, airbags, active seats and possibly rollover bars. Restraint devices 8 can be triggered individually. For the sake of simplicity, an occupant classification system is not shown. The signals from this occupant classification system also influence the triggering of restraint devices 8.

Figure 2:
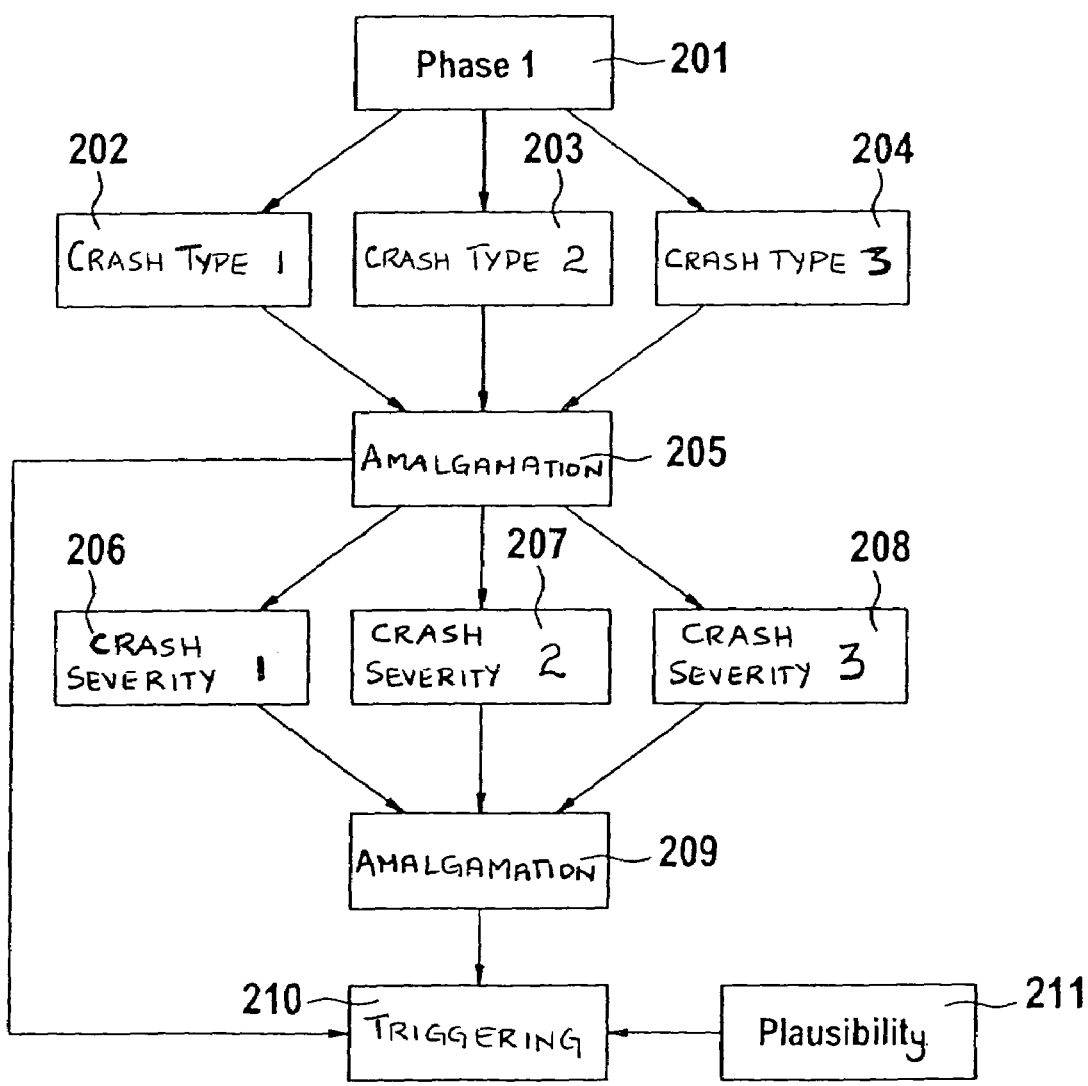
FIG. 2 shows a flowchart of the exemplary method according to the present invention.

Using various flowcharts and block diagrams, the operating sequence of the method according to the present invention, including the apparatus according to the present invention, is shown below. The method according to the present invention is shown in terms of its operating sequence in a flowchart in FIG. 2. The appropriate crash phase is set in method step 201. For this crash phase, parallel analyses are performed in method steps 202, 203 and 204 to determine whether a specific crash type has occurred. That is to say, the sensor signals are analyzed as to whether they identify a crash type, for example crash type 1 in 202, crash type 2 in 203 or crash type 3 in 204. For the sake of simplicity, only three crash types are represented, while many more than three crash types are possible. Crash types include frontal collisions, rear collisions, offset collisions, crashes into a deformable barrier, side collisions, crashes into a post, hard crashes and rollover events. The direction ascertained from the collision signals, for example, may provide an indication of the crash type. If a frontal collision has occurred, a very strong signal will be measurable in the X direction. If a rear collision has occurred, a very strong signal will also be measurable in the X direction, but in the opposite direction. In the case of offset crashes or side collisions, the appropriate methods are to be applied to identify each crash type based on the direction. In the case of a crash into a deformable barrier, the time characteristic will provide the indication of this crash type.

Non-triggers (AZT (Allianz Zentrum fuer Technik=Alliance Center for Technology), misuse) can be detected by characteristics in the signal itself. A truck underride on the part of a passenger car is to be classified via the temporal occurrence of signals, in this case of the upfront sensors and of the central control unit.

Through the use of two upfront sensors, offset crashes may be more finely classified, for example into crashes, in which the other party to the collision strikes the vehicle at an angle (angle crash) or whether the other party to the collision strikes at a degree of overlap smaller than 100%. Side crashes can be classified via the temporal occurrence and the pattern of sensor signals. An example here is the post into the door, which can be recognized as a crash type via the pressure signal, if a pressure sensor for sensing a side collision exists, and a suitable plausibility, and can be translated into a crash severity.

In subsequent method step 205, the results of individual method steps 202, 203 and 204 are amalgamated. This means that the actual crash type is now identified from the individual results of the crash-type comparisons in method step 205. If none of the three crash types dominate, then a mixed form is generated in method step 205 via weighting factors or probability values. One or more algorithms for determining the crash severity are selected and activated as a function of the crash type ascertained. If crash type 1, for example, was unequivocally identified as the crash type in method step 205, then there is a jump to method step 206 to process the algorithm for crash severity 1, since the latter is unequivocally associated with crash type 1. The equivalent also holds true for crash severity 2 in method step 207 and crash severity 3 in method step 208. In the case of a mixed form of crash types, then at least two crash-severity algorithms are activated. Even in the case of an unequivocal identification of a crash type, however, it is possible that at least two algorithms for determining the crash severity are processed, which are then amalgamated in method step 209. This amalgamation is also performed by a weighted sum. As a function of the crash type ascertained from method step 205 and the crash severity ascertained from method step 209, restraint devices 8 are triggered in method step 210. In this context, however, a plausibility check is still performed in method step 211 using the sensor signals to determine whether the restraint devices should be triggered at all.

Figure 3:
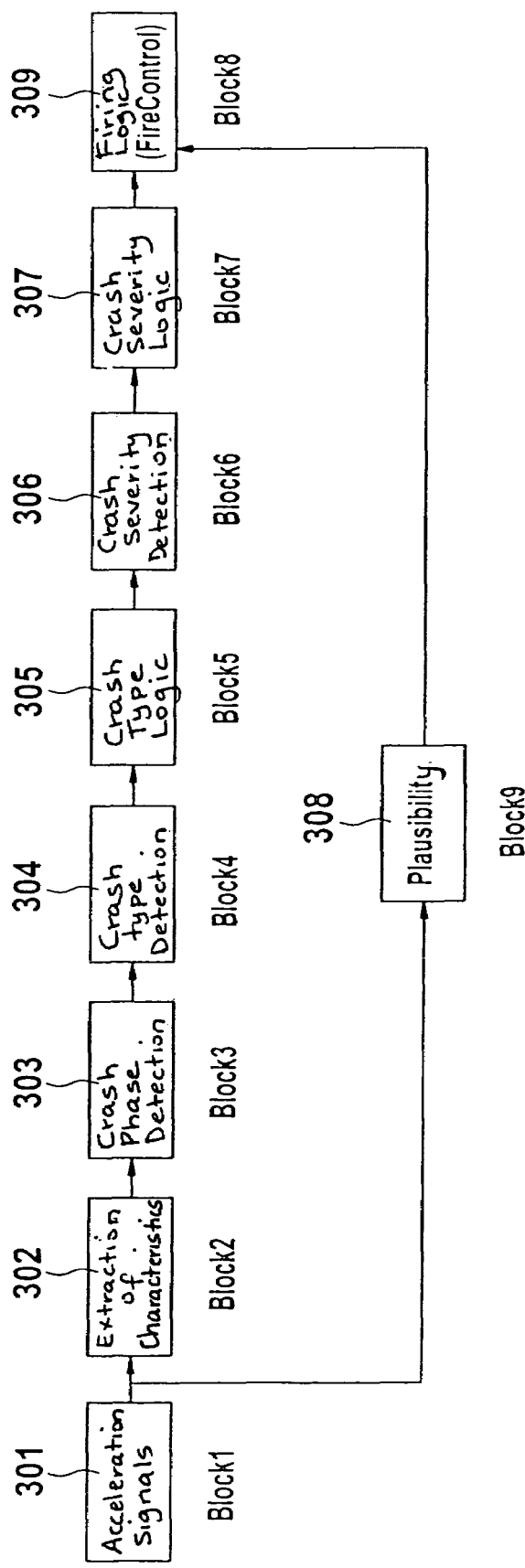
FIG. 3 shows a first block diagram of the exemplary method according to the present invention

FIG. 3 shows the method according to the present invention in a block diagram. In block 301, collision signals, which may be acceleration signals, are generated from sensors 1, 2, 3, 4 and/or 7. This information is subsequently made available to the method according to the present invention. In block 302, various characteristics are extracted from the acceleration signals, for example through integration, differentiation or other complex mathematical transformations such as filters, a Kalman filter for instance, or start or stop conditions for a time meter. The following occurs in block 303: From specific characteristics provided by the previous block 302, temporal information may be derived which makes it possible to divide a collision or an impact into different crash phases. The crash phases temporally succeed one another from the beginning of the crash until the end of the crash. The start of the algorithm is defined as the beginning of the crash, while the algorithm reset is decisive as regards the end point. The start of an algorithm is established for example by the fact that a specified noise threshold is exceeded. The number of crash phases is initially not limited. The crash phase can be represented by a time meter using the unit cycles, in which the cycles may represent the period between the individual computational steps of the algorithm, possibly also shorter or longer periods. This representation in a time meter corresponds to the maximum number of crash phases. The individual crash phases are used to control different sensitivities in the crash-type detection, that is, in block 304 and/or in the crash-severity detection in block 306. What is meant by sensitivities are threshold values of different magnitudes, with which the individual characteristics are compared so as to generate a decision or bring about the triggering of the restraint devices.

In block 304 of the crash-type detection, a classification of the types of collision is performed using the characteristics from block 302. These different classes may be derived from common crash tests. Here, crashes such as striking a deformable barrier with a degree of overlap of <100%, collisions in which the activation of an triggering arrangement or structure is not appropriate, driving maneuvers which feign a collision due to the acceleration signal (misuse), collisions in which the other party involved in the collision stands or moves at an angle to the direction of travel of the first vehicle, collisions which have a degree of overlap close to 100% may be classified. Not all crash types have to be classifiable within the individual crash phases. However, in individual crash phases, all relevant collision types may be ascertained independently of one another. Possible dependencies are not taken into account here. It is quite possible that several crash types are detected simultaneously. The results of the crash-type detection are combined in the following block 305. This block 305 represents a crash-type logic. Here the probabilities of the individual crash types detected are evaluated or determined. From this result, the sensitivities of crash-value detection 306 are influenced. Dependencies of crash types are processed in the crash-type logic in such a way that the most probable case is selected via a logic. It may well be the case in a real crash scenario that no unequivocal classification into one crash type class can be made. Examples for a combination of crash types are: ODB (impact onto a deformable barrier) and AZT (=insurance accident, in which the least possible damage occurs to the vehicle) detected. If the AZT crash prevails and only its corresponding crash-severity detection is activated, then a crash severity in the case of the AZT is 0. If no unequivocal decision can be made, it is possible to choose multiple sensitivities in the crash-severity detection and to evaluate them subsequently in the crash-severity logic. In block 306, i.e. in the crash-severity detection, crash severities are derived based on the characteristics of the sensor signals. These crash severities are then processed further within the firing logic, and the restraint device appropriate for this collision is activated so as to provide the occupants with optimal protection. In this context, the number of crash severities is not limited to the number of restraint devices. Within the crash-severity detection, paths having different sensitivities of the crash-severity determination may be activated as a function of the crash-type logic. The crash severity is determined in a linearly ascending fashion, the smallest crash severity corresponding to a collision in which no restraint device is to be activated. The greatest crash severity corresponds to the maximum protection to be activated. In this case, there is no temporal control of ignitors.

In block 307 of the crash-severity logic, different crash severities coming from preceding block 306 are combined in such a way that the vehicle occupants receive protection that is adapted to the situation. In the simplest case, this can be a priority according to the order of magnitude of the various crash severities. However, more complex logical interconnections may be implemented as well.

In block 309 of the firing logic, the crash severity and/or possibly the crash type transmitted in this block are assigned the appropriate ignitors, and the synchronized activation is also ensured. Here there is also the possibility of an activation as a function of conditions within the vehicle. The states concerned here may be, for example, the position of the occupant, his/her weight, the status of the seatbelt. This applies to all permissible sitting positions in the vehicle.

Block 308 represents the plausibility check. Within this block 308, possible errors and discrepancies within the algorithm path are mitigated in their effect. For an activation of restraint devices to occur, the decision should be independently confirmed. A faulty sensor could result in a triggering, which is why the plausibility should be confirmed by another sensor, since here the probability that 2 sensors are simultaneously defective is significantly lower than in the case of one faulty sensor. This is why an incorrectly functioning microcontroller, which performs the calculation and evaluations, could not cause a triggering. Additional error scenarios could be reduced in their effect by this plausibility.

Figure 4:
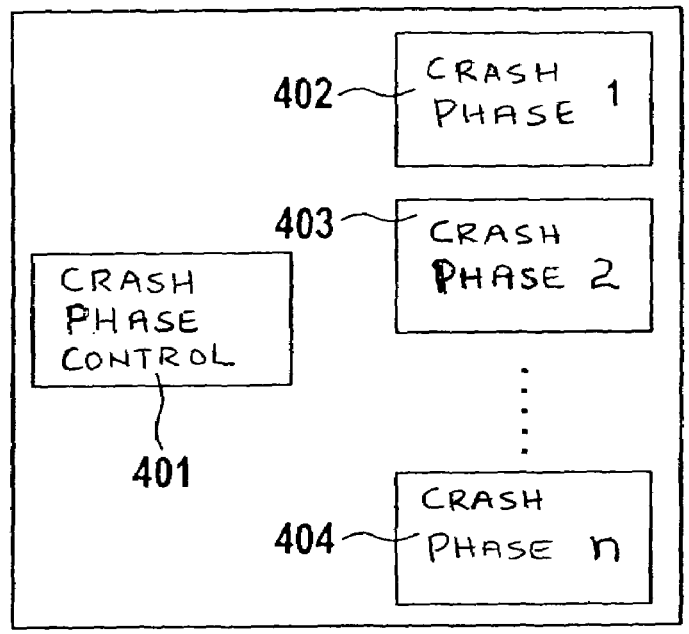
FIG. 4 shows a second block diagram of the exemplary method according to the present invention.

FIG. 4 shows in a block diagram that a crash-phase control 401 triggers individual crash phases 402, 403 and 404.

Here temporal data are extracted from the sensor signals and are translated into individual crash phases. Such an extraction may also be achieved via a timer or counter which is started and stopped as a function of the signal. Control 401 then takes on the task of switching individual crash phases 402-404, or possibly even more, to active. This occurs as a function of the temporal data from the sensor signals or the timer. Only one crash phase may be switched to active at any one time. Here the crash phases are graded in an ascending order and are successively activated in a crash scenario. This occurs either in a fixed manner via a counter or as a function of the sensor signals.

Figure 5:
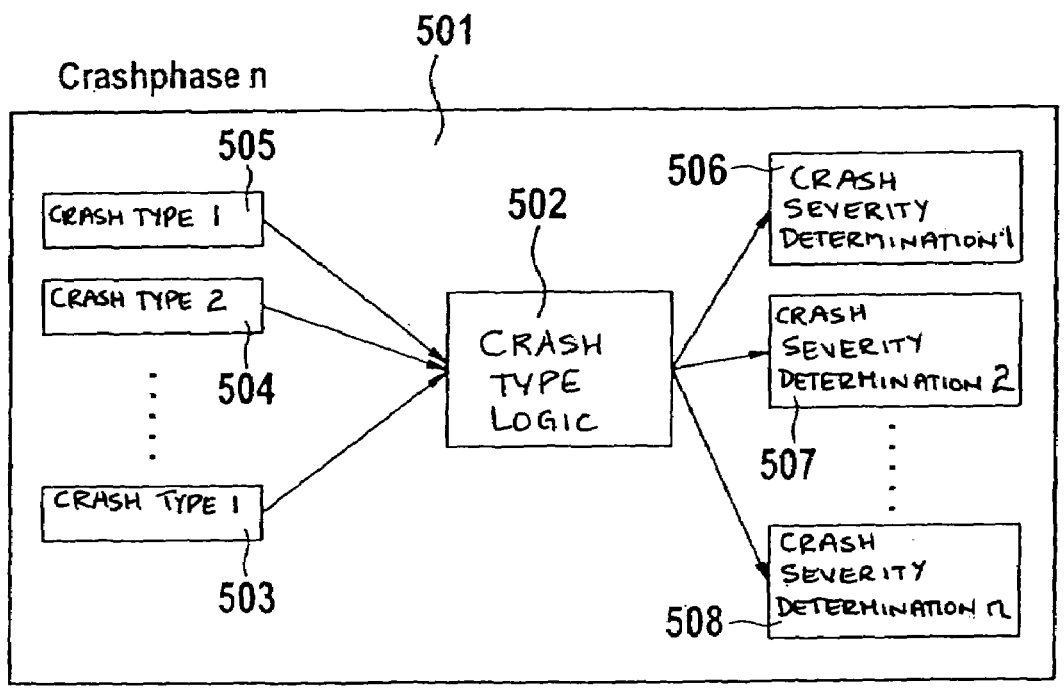
FIG. 5 shows a third block diagram of the exemplary method according to the present invention.

FIG. 5 shows the method according to the present invention in another block diagram. As shown above, for a given crash phase 501, an analysis is performed concurrently, and specifically in blocks 503, 504 and 505, to ascertain which crash type applies. This is determined in method step 502 of the crash-type logic using the results of these individual analyses. As a function of the determined crash type or of a weighted sum of various crash types, the crash-type logic will then select at least one of crash-severity algorithms 506, 507 or 508 to ascertain the crash severity from the sensor signals.

Figure 6:
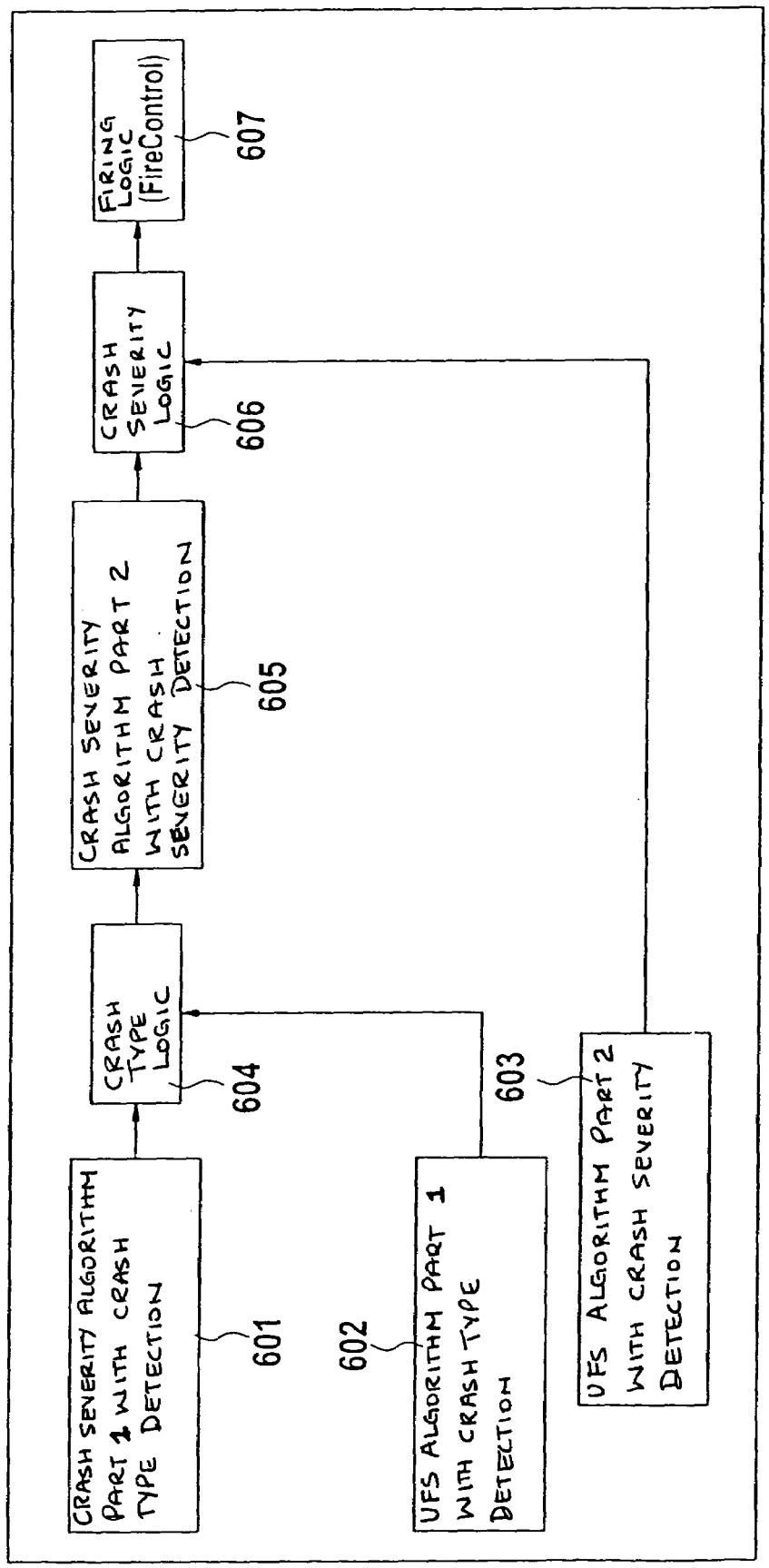
FIG. 6 shows a fourth block diagram of the exemplary method according to the present invention.

FIG. 6 shows an expansion of the method of the present invention. In block 601, the crash severity algorithm, as shown in FIG. 3, is run using the crash-type detection. This is supplied to crash-type logic 604, which is here also connected to a corresponding crash-type algorithm for upfront sensors 602. Thus, the crash type here is generated from a signal from a central sensor, which in method step 601 yields a corresponding crash type, and the upfront sensors from method step 602. In the process, as shown above, the individual crash-type results of the central sensor or of the upfront sensors may be suitably reinforced or weakened. In place of, or in addition to, the upfront sensors, other sensors such as side-impact sensors or surround sensors may be used here as well. The crash-type logic, which thus determines the crash type, is connected to the subsequent crash-severity detection 605. As shown above, the crash severity is determined from the sensor signals using at least one algorithm. In method step 606, this result is then combined via a crash-severity logic with a crash-severity detection of upfront algorithm 603. On this basis the crash severity is then determined which is used for triggering firing logic 607. Other sensor modules such as side-impact sensors or surround sensors may be used here as well.

The approach to amalgamation is based here on the evaluation of the quality of the individual crash-type or crash-severity data. Different algorithms, especially if they access different sensor data, provide crash-type and crash-severity data of different quality. While one algorithm may be more precise in ascertaining crash type A, another algorithm will have advantages in determining another crash type. In the amalgamation of the information, these differences in quality are now taken into account using an appropriate weighting. Since the logic is implemented in software, it may be modified or expanded through simple reprogramming. The evaluation of the quality of the crash-types and crash-severity decisions of the various algorithms is performed with simulations using real or simulated crash test data, i.e., acceleration data.

An optimally functioning upfront algorithm, for example, is better suited for detecting the degree of overlap than a central algorithm based on a central sensor. Thus, in determining crash types and crash severities depending on the result of the detection of the degree of overlap, the information of the upfront algorithm may be weighted more strongly than the information of the central crash-severity algorithm. On the other hand, in the case of crash types in which the central crash-severity algorithm allows for more precise information, it may accordingly be weighted more strongly than the upfront algorithm. Every crash phase has an independent logic for determining crash type and crash severity. This feature may be exploited advantageously in the amalgamation with the information of the other algorithms. The quality of the data from different algorithms generally changes in the course of a crash. The upfront algorithm, for example, which is based on a sensor system in the front end of the vehicle, provides useful additional data to the central crash-severity algorithm only up into the range of the middle crash phases. In late crash phases, by contrast, there is little additional informational content. A destruction may be assumed in this case. In the amalgamation, the crash-type and crash-severity data of the various algorithms may be weighted differently in each phase in accordance with their quality at that time.

The method described up to this point may be improved by using a theoretical probability approach in the amalgamation of crash severity and crash type. In practice, the central control unit is normally subordinated in its importance to the upfront sensor system. In some crash situations, however, this is not always correct. On the basis of the present invention, the information provided by the various sensors is to be appropriately amalgamated according to its importance. A crash triggering individually adapted to each particular crash may thereby be achieved. Furthermore, the approach is chosen such that a simple amalgamation of additional sensors may be readily integrated into the design. The flexibility of the algorithm may be expanded accordingly via a parameter setting or a specific calculation of the importance.

Figure 7:
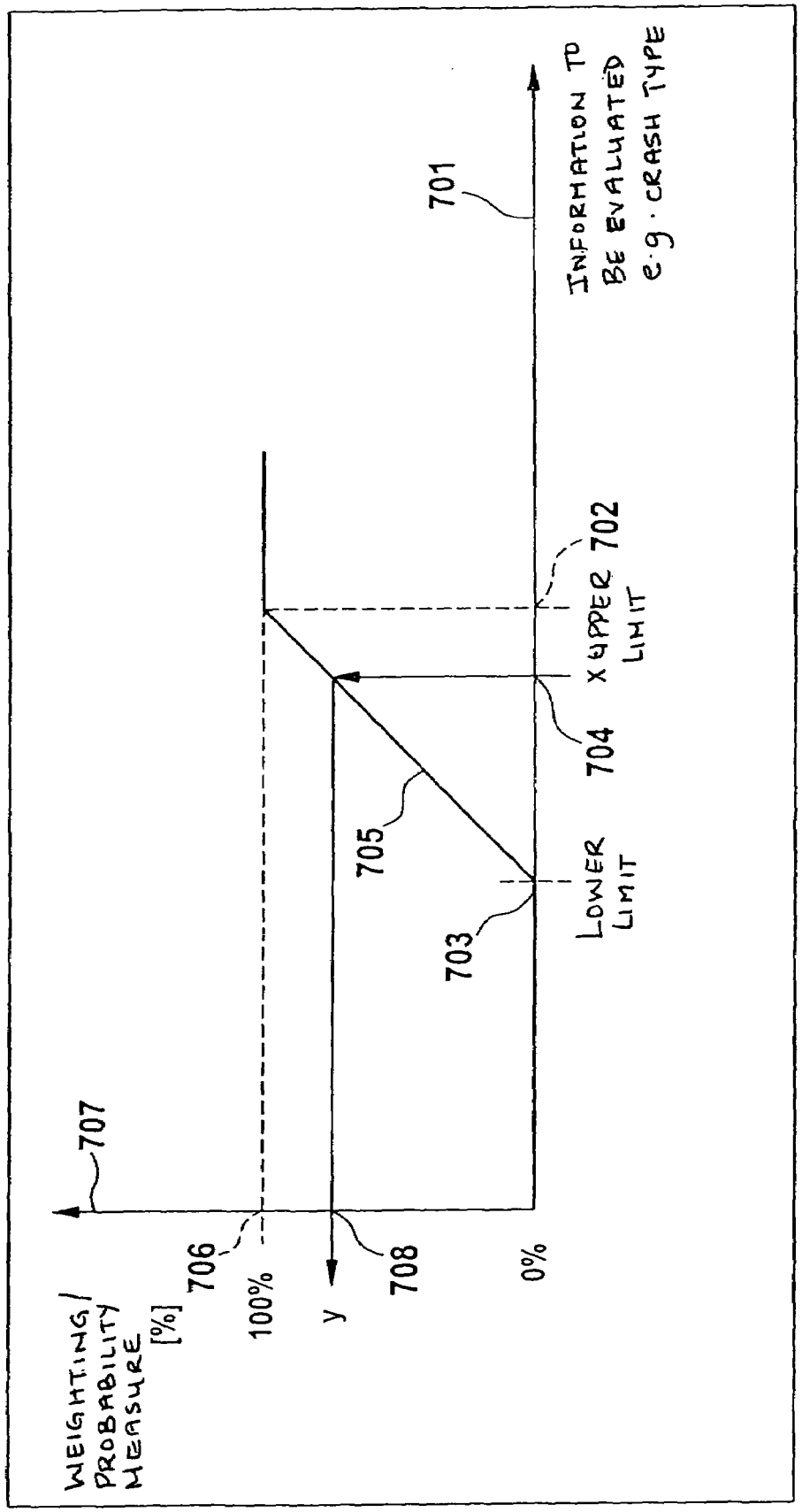
FIG. 7 shows a diagram for determining the weighting.

The approach to amalgamation, based on a probability, is first explained in general terms. A datum directly obtained or derived from the sensor system may be transformed via a ramp function into a measure of probability. The ramp function may be described by a lower and an upper limit or threshold and their linear correlation. This correlation is represented in FIG. 7. The information to be evaluated, for example the crash type or the crash severity, is plotted on abscissa 701. The weighting or the measure of probability is plotted in %, for example, on ordinate 707. The ramp function has a lower limit 703, an upper limit 702 and a gradient 705. Thus, crash type 704 is allocated to probability measure 708. The upper limit 702 corresponds to 100% 706. The lower limit 703 corresponds to 0%.

As described above, the principle of the ramp function may be used to represent a datum to be processed as a percentage measure or may be used as a function for calculating weighting factors.

The respective limits are set via an application. The advantage in this method is the high flexibility. On the one hand, a function may be suppressed in that the lower and upper limits are designed in such a way that given a specified input value, an output value can never be reached by the processing rule, i.e. the output of the measure is thus 0 or amounts to 0% and is hence invalid for additional functions. On the other hand, due to the continuous output, the output may be converted into a binary output by setting the upper and lower limits to an average value, e.g. the value 50. This yields only 2 states, either 0 or 100. This set-up is performed separately for each characteristic. The following quantities, for example, for the crash-type and crash-severity information for the various sensors are thereby obtained.

Figure 8:
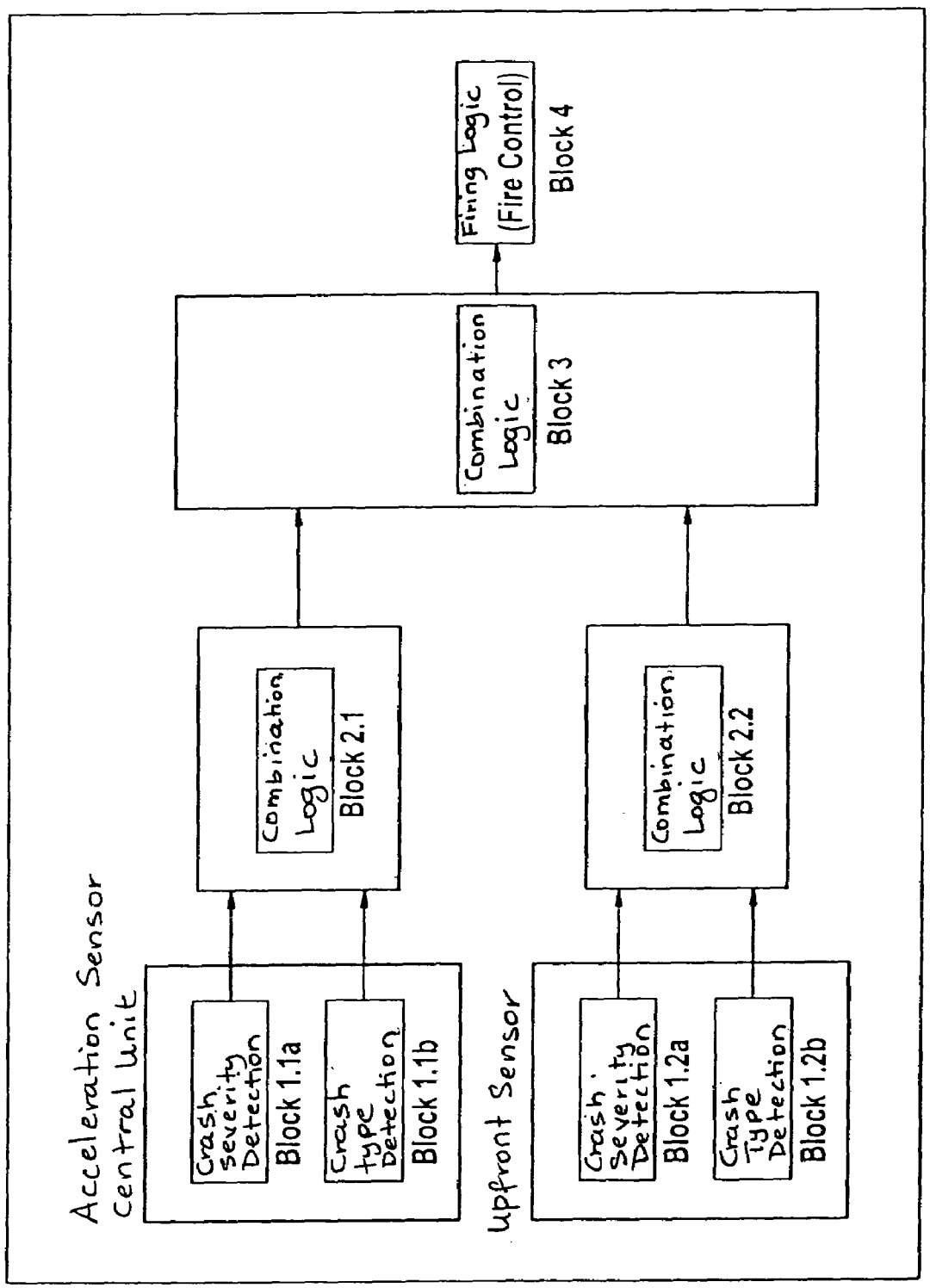
FIG. 8 shows a fifth block diagram of the exemplary method according to the present invention.

The individual data are obtained from blocks 1.1*a* through 1.2*b* in FIG. 8. The information applicable to the respective sensor is now amalgamated in the logic (block 2.1 and block 2.2) as follows:

$$ZBS = \frac{CRST * Factor1 + CSST * Factor2}{(Factor1 + Factor2)}$$

$$UFS = \frac{CRUFS * Factor3 + CSUFS * Factor4}{(Factor3 + Factor4)}$$

Factors i (here i=1□4) may either be likewise calculated via other characteristics and corresponding ramp functions, or they are permanently set parameters in the EEPROM. Hence initially a specific amalgamation of the individual data from the central control unit and the upfront sensor system is carried out separately. If required, the information thus obtained may be transmitted to other modules. Centrally, however, in order to arrive at a triggering decision, these data are combined in a separate evaluation logic (block 3) using the same schema.

$$Total = \frac{ZBS * Factor5 + UFS * Factor6}{(Factor5 + Factor6)}$$

As above, the factors may be calculated or may be preset values. Subsequently, this information is processed accordingly by a triggering logic in block 4.

Individual values such as CRST, for example, may of course in turn be generated according to the method described above. This means that the crash severity algorithm, which itself is able to detect different crash types, is able to make these more precise using a weighted sum. If such a determination is also performed for the crash type of the upfront sensor information (CRST), then it is possible to combine this information. This also applies to information such as CSST and CSUFS.

This then results in the following alternative of determination:

$$CRTotal = \frac{CRST * Factor6 + CRUFS * Factor7}{(Factor6 + Factor7)}$$

$$CRTotal = \frac{CRST * Factor8 + CRUFS * Factor9}{(Factor8 + Factor9)}$$

In the above computational rule, of course, CRST may in turn have been generated from the individual crash types via a weighted sum. The same applies to CRUFS, CRST and CRUFS.

EXAMPLE $$CRTotal = \frac{CRST\_1 * Fak10 + CRST\_2 * Fak11 + \ldots + CRUFS\_1 * Fak20 + CRUFS\_1 * Fak21 + \ldots}{(\Sigma Faktoren)}$$

$$CRTotal = \frac{CRST\_1 * Fac10 + CRST\_2 * Fac11 + \ldots + CRUFS\_1 * Fac20 + CRUFS\_1 * Fac21 + \ldots}{(\Sigma Factors)}$$

Here, _1 represents the various crash types or crash severities, the prefix indicating the source of the signals.

Figure 9:
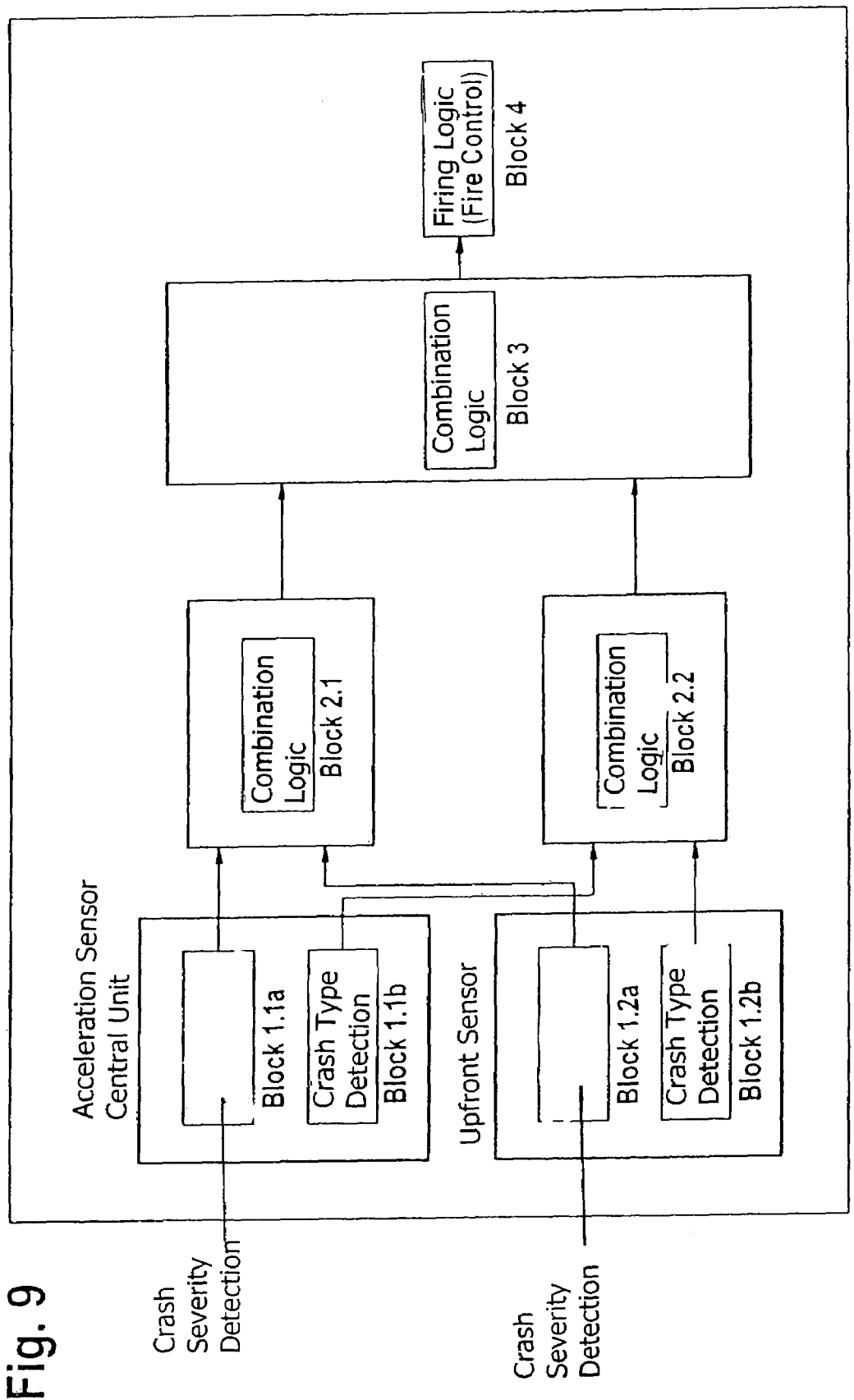
FIG. 9 shows a sixth block diagram of the method according to the present invention.

As can be seen in FIG. 9, the data from blocks 1.1*a* through 1.2*b* are combined in deviation from the basic idea. Block 2 contains the combinations of similar data and block 3 brings these data together to make them available in block 4.

What is claimed is:

1. A method for triggering restraint devices, in which at least one collision-indicating signal is generated, the method comprising:
   from a moment that a collision is detected, specifying temporally defined crash phases; for every crash phase, a crash type and a crash severity being determined from the signal; and
   triggering appropriate ones of the restraint devices as a function of the crash severity and the crash type.

2. The method of claim 1, wherein the crash phases are defined as a function of the vehicle type.

3. The method of claim 1, wherein the crash type is determined for every crash phase and for different possible crash types, the at least one signal is analyzed, and results of the analyses are combined with one another to determine the crash type.

4. The method of claim 3, wherein, to determine the crash severity, at least one algorithm is selected as a function of the crash type, and results from the at least one algorithm are used to determine the crash severity.

5. The method of claim 1, wherein, from the at least one signal, a plausibility signal is derived and used to check the triggering.

6. The method of claim 1, wherein, for different collision sensors in the vehicle, the crash type and the crash severity are in each case determined separately for a respective crash phase, and the crash types and crash seventies determined in this manner are in each case combined for use with the triggering.

7. The method of claim 6, wherein, for the combining, the respective crash types and crash seventies determined for the different collision sensors are evaluated as a function of at least one of he relevant crash type, the relevant crash severity and the relevant collision sensor.

8. The method of claim 7, wherein the evaluation is performed continuously.

9. The method of claim 7, wherein the evaluation is performed with specific thresholds.

10. An apparatus for triggering restraint devices, in which at least one collision-indicating signal is generated, comprising:
   a specifying arrangement in which, from a moment that a collision is detected, to specify temporally defined crash phases; for every crash phase, a crash type and a crash severity being determined from the signal; and a triggering arrangement to trigger appropriate ones of the restraint devices as a function of the crash severity and the crash type.

11. The apparatus of claim 10, wherein the crash phases are defined as a function of the vehicle type.

12. The apparatus of claim 10, wherein the crash type is determined for every crash phase and for different possible crash types, the at least one signal is analyzed, and results of the analyses are combined with one another to determine the crash type.

13. The apparatus of claim 12, wherein, to determine the crash severity, at least one algorithm is selected as a function of the crash type, and results from the at least one algorithm are used to determine the crash severity.

14. The apparatus of claim 10, wherein, from the at least one signal, a plausibility signal is derived and used to check the triggering.

15. The apparatus of claim 10, wherein, for different collision sensors in the vehicle, the crash type and the crash severity are in each case determined separately for a respective crash phase, and the crash types and crash severities determined in this manner are in each case combined for use with the triggering.

16. The apparatus of claim 15, wherein, for the combining, the respective crash types and crash severities determined for the different collision sensors are evaluated as a function of at least one of he relevant crash type, the relevant crash severity and the relevant collision sensor.

17. The apparatus of claim 16, wherein the evaluation is performed continuously.

18. The apparatus of claim 16, wherein the evaluation is performed with specific thresholds.

* * * * *